United States Patent [19]

Barker

[11] 4,114,595
[45] Sep. 19, 1978

[54] SOLAR ENERGY COLLECTOR AND GLAZING SYSTEM

[76] Inventor: Harold Reed Barker, 805 29th St. #252, Pittsboro, N.C. 80303

[21] Appl. No.: 813,289

[22] Filed: Jul. 6, 1977

[51] Int. Cl.$^2$ ............................ F24J 3/02; E04D 1/36
[52] U.S. Cl. ..................................... 126/270; 165/67; 52/762; 52/460; 52/468; 237/1 A
[58] Field of Search ............... 126/270, 271; 237/1 A; 165/48.67, 49; 52/495, 466, 468, 460; 47/17

[56] References Cited

U.S. PATENT DOCUMENTS

| | | | |
|---|---|---|---|
| 3,062,339 | 11/1962 | Geyser | 52/460 |
| 4,000,850 | 1/1977 | Diggs | 126/271 |
| 4,018,213 | 4/1977 | Mann, Jr. | 126/271 |
| 4,051,833 | 10/1977 | Vandament | 126/270 |

FOREIGN PATENT DOCUMENTS

559,211  7/1957  Belgium ................................... 52/460

Primary Examiner—Kenneth W. Sprague
Assistant Examiner—James C. Yeung

[57] ABSTRACT

A direct air heating solar energy collection apparatus and glazing system therefor are described. Unique framing members are utilized to create modular collector assembly panels, to provide a glazing system for the collectors, and to contain reflective trapping members in a precision spaced array. The framing members are formed in cross sectional shapes that admit of multiple uses in the overall frame structure of the apparatus, some of the members being utilized for a plurality of different mechanical functions within the framing system.

6 Claims, 9 Drawing Figures

SOLAR ENERGY COLLECTOR AND GLAZING SYSTEM

FIELD OF INVENTION

This invention relates to solar energy collector apparatus in general and to a specific framing or glazing system for the collector apparatus suitable for making modularized collector arrays.

PRIOR ART

A very great deal of prior work has been done in the area of solar energy collection devices and specifically in the area of direct hot air energy collection apparatus and systems. For example see U.S. Pat. No. 2,484,127 which illustrates a solar home heating system in which direct heating of hot air in the collector is utilized to heat water which is the energy storage medium which is later used to transfer the heat back to the air for home heating. Such systems are expensive to build and are not easily constructed in an expandable form which can effectively provide additional collector area for larger homes. Also such designs incorporate the undue complexity of liquid handling mechanisms and associated problems of potential leakage, etc.

Some solar collectors, in order to take advantage of maximum sun angles, have utilized tracking facilities such as that illustrated in U.S. Pat. No. 1,814,897 in which the solar hot air system is shown with an elongated cylinder collector for tracking the sun's motion. Such devices, while potentially more efficient than fixed position collectors, are expensive and complex and would be subject to malfunction due to the mechanical aspects of the collector.

Of course, it is well known to construct homes with exposed panels of glass along the south or west walls to capture the sun's energy. It is also well known to provide suitable architectural roof overhangs to shield the windows during periods of time such as summer when energy capture is not as necessary.

Yet another hot air solar energy collector system is shown in U.S. Pat. No. 3,957,109 in which a rather complicated heat exchanger is shown for effectively collecting energy in an air medium and transferring to liquid. The result of all of this prior art has been, with the exception of Holmes specifically designed and constructed with south facing windows, a record of minimal success and limited usage.

What remains is to provide low cost, easily constructed or assembled solar energy collection apparatus which can be easily adapted to existing structures or retrofitted thereto. Such a desired system should also be of minimal complexity in mechanical or electrical parts so that it would be highly reliable and not subject to the requirement of maintenance or adjustment. Of course, since large panels of glass must be handled in many solar energy collector devices, it is most desirable that an efficient, easy to assemble precision framing or glazing system be provided in which the solar energy collectors can be constructed on site to operate effectively and without the necessity of skilled laborers or precision assembly work.

OBJECTS OF THE INVENTION

In light of the foregoing difficulties with the prior art, it is an object of this invention to provide an improved, modularly assembleable solar energy collector apparatus and glazing system therefor of a more improved type.

A further object of the present invention is to provide an improved precision framing means which may be easily assembled without expensive tooling or skilled labor.

A further object of the invention is to provide an improved solar collection apparatus which can be adapted to existing structures by either retrofit or initial construction installation without the necessity to greatly modify the architectural or existing structure of the building.

SUMMARY

The foregoing and still other objects of the invention not specifically mentioned heretofore are met in the present invention by providing specially dimensioned and formed extruded frame members for glazing the solar energy collector apparatus. The extruded members serve multiple tasks to eliminate unnecessary cost and to simplify assembly in a precision manner but without the use of skilled labor or precision tools. Preformed gaging, interlocking and spacing means are designed into the framework members so that, upon assembly, precision gaging and spacing of the elements as necessary to support glazing panels and to accommodate expansion and contraction, etc., are affected. A number of reflector baffles are supported integrally by the framework behind the outlet facing glass collector surface and these baffles effectively trap solar energy within the collector apparatus and transfer the heat produced to air which is passed through the collector and into the house or directly into a storage reservoir. A unique aspect of the present invention is that the reflective baffles are so arranged and supported integrally in the glazing framework that an highly efficient collection results during the winter months when sun angles are low and a reduced efficiency collection results in summer months when summer angles are high and it is not desired to collect as much energy.

BRIEF DESCRIPTION OF THE DRAWINGS

The invention will now be described with reference to a preferred embodiment thereof which is further illustrated and described with reference to the Figures in which.

DETAILED SPECIFICATION

Seven different cross sectional forms of framing members are required in the completed assembly of the preferred embodiment of this invention. The framing members are preferably extruded aluminum or other similar material having light weight and high strength. As will be discussed shortly, only four different cross sectional shapes or extrusions are required in production and fabrication of the raw material but these four shapes can be used for constructing all seven different necessary shapes for the final assembly since three required shapes are constructed by a suitable cutting of the several basic or initial extrusion shapes into longitudinal or transverse sections.

Figure 2:
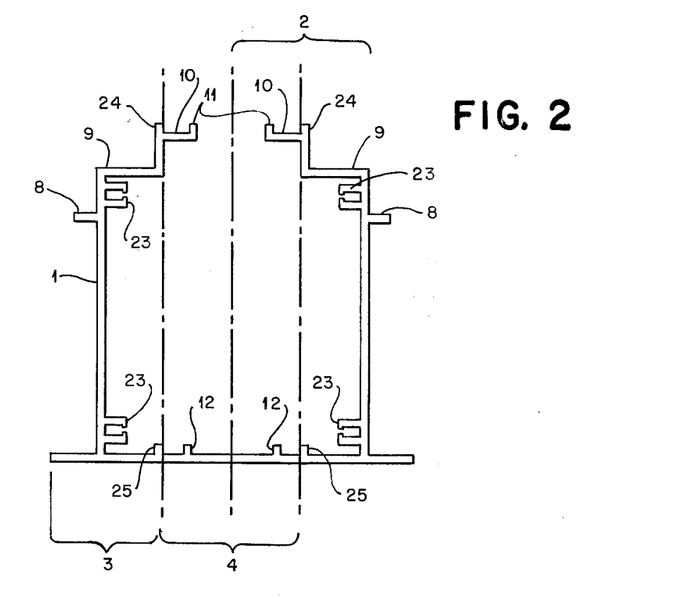
FIG. 2 illustrates a transverse cross section of one of the main framework extrusion shapes and illustrates various cutting lines which are utilized to form several other framing members from the single extrusion.

The first cross sectional shaped support member is illustrated in FIG. 2 in a cross sectional end view. It illustrates an aluminum extrusion having walls and integral elements for specific purposes to be described. In FIG. 2, several vertical dashed lines are shown to illustrate potential longitudinal cuts that may be made in the basic form of extrusion 1 to produce new forms identified as a half section 2, a third section 3, or a fourth section 4. All of these various potential cross sectional shapes have specific uses in the final assembly as will be described.

The first support member 1 illustrated in FIG. 2 has various elements including horizontal support ledges 8, 9 and 10 in a stepped relationship to one another for supporting various elements of the framework in the final assembly. Precision distance or gaging members are shown as small projections 11 and 12 which are utilized in the assembly as will be described. Also formed at the base of the cross section in FIG. 2 are a plurality of interior facing fastener receiving channels 23 which are utilized to provide a convenient and precision mounting means for screws used to affix segments of cross sectional member 1 in a vertical or horizontal dimension to the house structure and to framework members. Small supporting projections 24 and 25 are also shown, the purpose of which will be made clear below.

Figure 1:
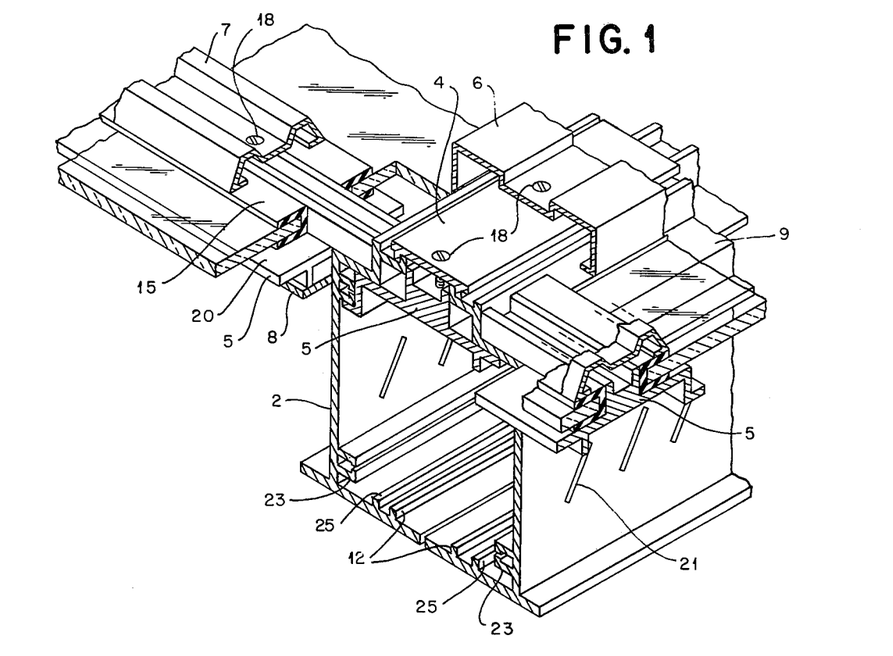
FIG. 1 illustrates a partial assembly of the glazing or framing system with the glass panels in place to show the method in which uniquely formed framing members are supported on one another, and how they provide precision gaging or spacing upon assembly, and support glass solar collector surface panels in a manner that is structurally sound and mechanically tight in a precision frame.

Turning to FIG. 1, a partial assembly of the glazing system of the solar collector is shown. The first cross sectional member 1 is shown joined to horizontal support members having cross section 5 which directly rest on support ledges 8 of member 1 and on ledge 9 of member 1 and which are affixed thereto by suitable fastening means or screws (not shown). In the interior portion of cross section 1 in FIG. 1, the precision gaging and spacing frame member 4, which appears as a section of cross section 1 in FIG. 2, is utilized as shown with screws 18 and segments of cross sectional member 5 to close the top of cross sectional member 1 and to provide a steady mounting for exterior clamp cross sectional member 6 which is utilized to bear against glass panels and seal them firmly under pressure against surfaces of the support framework members 5 at surface 20 thereof or against surface 9 of member 1. Sealing beads of rubber or other suitable soft, weather-resistant material are shown as sealing gasket or bead 15 which completely surrounds each panel of glass at its edge and is sealed to surfaces 9 and 20 by the exterior clamp means 6 and 7. Cross sectional member 7 is of a different form than 6 for reasons which will be discussed and is intended for use in the horizontal direction in the framing system. Exterior clamping and sealing means 6 is of a different cross section that is intended for use in the vertical direction in the completed framework. The four basic different extrusions which are required are, therefore, 1, 5, 6 and 7 in FIG. 1.

Cross section 4 is generated by cutting a segment from member 1 as shown in FIG. 2 and the other cross sectional shapes 2 and 3 shown in FIG. 2 are utilized at other portions of the completed framework assembly as will appear later.

Figures 3, 4:
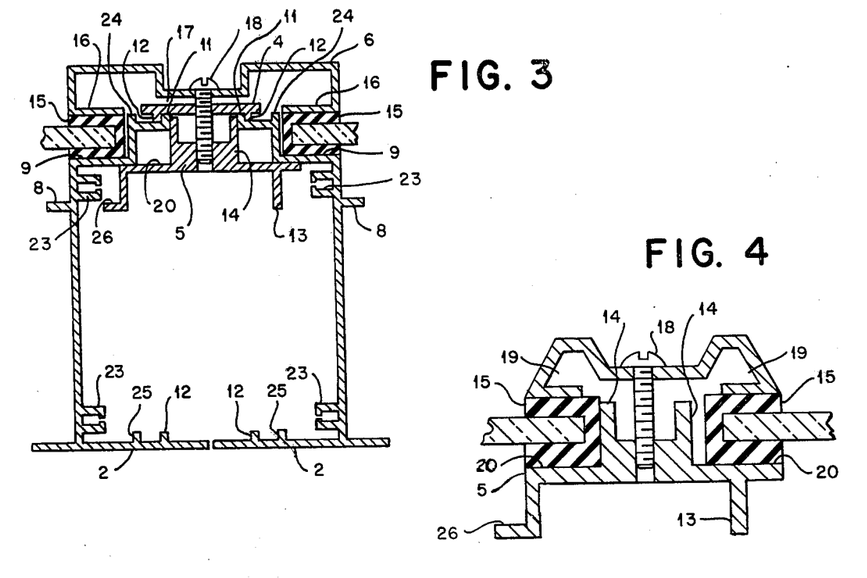
FIG. 3 illustrates a cross sectional view of a partial assembly of the framing system for the solar collector in the preferred embodiment.
FIG. 4 illustrates another partial assembly utilized in horizontal support of glazing panels in the preferred embodiment of the invention.

Turning to FIG. 3, two of the second-type cross sectional members 2 as shown in FIG. 3 have been generated by cutting longitudinally through the center of one of the first cross sectional members 1. These members are joined together by a clamp which comprises a segment of cross sectional members 5, which forms a precision interior gage for bringing the separate members 2 into proper spacing with one another, and by exterior clamping gage 4 having projections 12 which form a precision outside clamp against projections 11 to hold members 2 in a fixed lateral relationship to one another for proper glazing and to allow for thermal expansion and contraction. A suitable screw or other fastener means 18 passes through the exterior clamp segment member 6, which is a different cross section, and it may be seen that the glazing gasket 15 is held in compression by surfaces 16 and 9 in this manner. The small gap 17 is created beneath the underside of member 6 and the top surface of precision spacing gage member 4 to allow for flexing in member 6 to maintain compression on sealing gaskets 15. Small spaces are left between the end of each glass panel with its associated rubber gasket 15 and the vertical rise between surfaces 9 and 10 of members 2 so that horizontal thermal expansion of the glass may be accommodated. The space between edges 14 of member 5 is precisioned formed in the extrusion process to be exactly the interior dimension between the protrusions 11 of members 2 or 1 which is necessary to achieve this critical expansion spacing. Furthermore, the interior spacing between projection 12 as shown in FIG. 2 where cross sectional member 4 is generated by longitudinal cutting of member 1, is that necessary to clamp members 2 together into tight abutment with sides 14 of member 5 as shown in FIG. 3. Surface 20 of member 5 abuts against the underside of each member beneath the ledge or surface 9 to provide a secure fastening or pressure surface for the tension that will be generated by fastener 18 when it is tightened. Although not shown in FIG. 3, additional fasteners 18 will be utilized along the element 4 to fasten it in a similar fashion to member 5. Member 5 is typically a transverse segment of a few inches in length taken in a direction extending in and out of the page of FIG. 3. The short segment will be cut from elongated pieces of cross sectional member 5 which are salvaged as scrap from the cutting of the horizontal cross sectional members 5 to construct the framework assembly. Similarly with exterior precision spacing and gage members 4, there will be short transverse segments in the longitudinal direction running in and out of the gage in FIG. 3 which would be salvaged from cuts made in generating cross sectional members 3 shown in FIG. 2. The member 4 would be an elongated strip in the direction running in and out of page of FIG. 2 which could be cut into shorter segments for use as shown in FIGS. 3 and 1. Since there is very little or no waste of material, an economical structure results at the same time providing a precision gaging means for later assembly of the individual assemblies in a glazing framework for the solar collector system.

In FIG. 4 is shown an enlarged cross sectional view from a horizontal frame member of cross section 5 in which a sheet of glass surrounded by sealing gasket 15 is held clamped between surface 20 of member 5 and surface 19 of member 7 by suitable screw fastening means 18 as shown. A gap is left on side of member 5 between the vertical wall 13 and the adjacent sealing gasket 15 on the side of horizontal member 5 in the assembly which will be at the top of glazing panel to allow for thermal expansion in the vertical direction in those panels. Member 5 has projections or legs 13 which are of the exact length as required to contact surface 8 of members 1, 2 or 3 and produces a co-planar relationship between surface 9 of members 1, 2 or 3 and surface 20. Thus when a horizontal member 5 is joined to members 1, 2 or 3, an intersection presents a smooth planar ledge on which sealing gasket 15 can be effectively supported. A small condensation channel is formed by an L-shaped projection 26 and 13 at the side of member 5 which will be toward the top of the completed framework assembly so that condensation which may form on the inner surface of the glass panel will not run down the interior and collect at the bottom of the assembly. Instead, condensation will collect in the channel formed by the leg 26, 13 and the glass and its sealing bead 15 which will later evaporate into air flowing through the collector as will be described.

Figure 5:
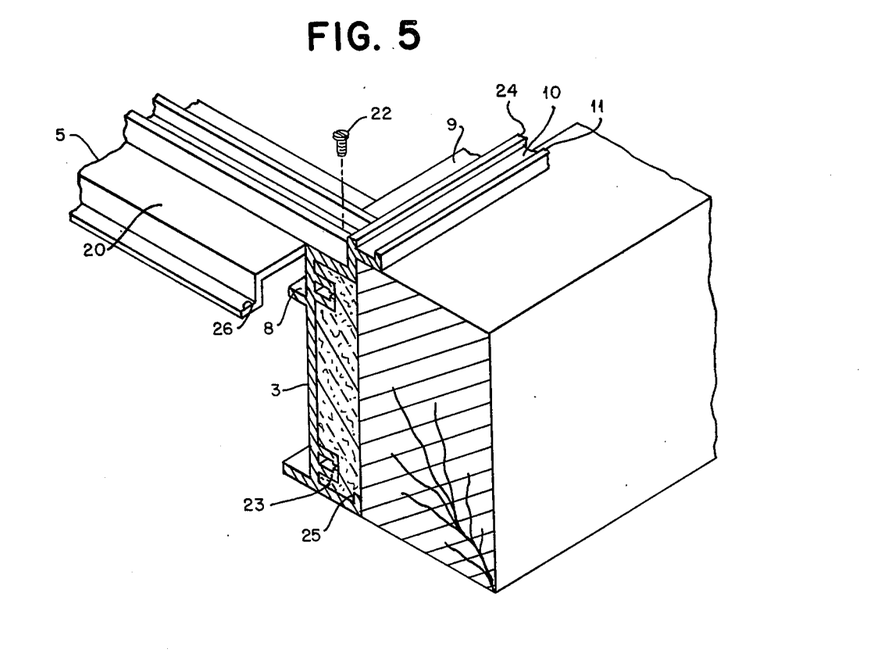
FIG. 5 illustrates how one of the members, which can be formed from the cross section shown in FIG. 2 is utilized when attaching a complete framework assembly to wooden structural members.

Turning to FIG. 5, cross sectional element 3, constructed by an appropriate cutting along the lines illustrated in FIG. 2 of main extrusion 1, is shown in relationship to a typical "four-by" dimensional piece of lumber. Such an arrangement will exist at the side of the completed modulized assembly when no further glazing is required. It can be seen that the dimension provided on the interior of member 3 between the underside of surface 10 and the bottom wall is exactly that required for a 4 inch nominal dimensional piece of lumber. The horizontal member 5 is shown together with a suitable fastening screw 22 as it would appear when assembled with member 3. It may be seen that surface 9 of member 3 and surface 20 of member 5 will be co-planar due to the accurate gaging produced by contact between leg 13 of member 5 and surface 8 of member 3. Small projection 25, which is molded into the bottom wall of member 1 and which is carried over into member 3 when the cut has been made, serves to prevent the 4-inch nominal dimensional lumber from riding up into the interior cavity generally beneath surface 9 in the bottom wall. Insulation will be inserted into this interior cavity throughout entire perimeter to reduce heat loss to wood member.

Figures 6, 7:
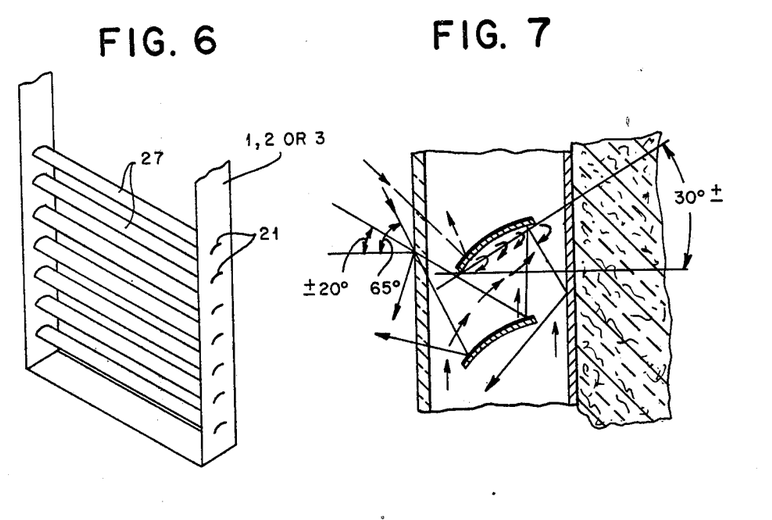
FIG. 6 is a schematic diagram illustrating the basic principles of the solar collection techniques utilized in the preferred embodiment of the invention.
FIG. 7 illustrates in schematic form how the highly nonreflective baffles operate in conjunction with varying sun angles to effectively trap solar energy within the collector constructed as in the preferred embodiment.

Turning to FIG. 6, the schematic construction of a solar collector is shown in which curved slats 27 are angled in slot 21 which may be in frame members 1, 2 or 3. Generally, the outer surface can be glazed with suitable glass or other transparent material to allow the sun rays to enter and strike the curved slat 27.

It is well known that there is a greenhouse effect in which infra red energy will not be retransmitted through the glass surface facing the slats in FIG. 6. The exterior glass surface has not been shown in FIG. 6. nor has the rearward panel, which would be insulated, shown. It is to be understood by those skilled in the art that slats 27 should preferably be blackened or otherwise treated so as to absorb solar energy more effectively and reradiate more energy in the infra red region.

Turning to FIG. 7, a schematic sectional view of the partial assembly of the collector shown in FIG. 6 is illustrated. In FIG. 7 a typical glazing member 30 comprising a sheet of glass and supported on a framework of members 1, 2 or 3 suitably joined by member 4 and member 5 (not shown) would be understood to exist in a completed collector. A rearward wall 28 of metal, glass or other suitable fireproof material which is insulated by insulation layer 29 is also illustrated. It is to be observed that slats 27 and the blackened top surface and the opposite under surface (which may or may not be blackened) are shown in the preferred embodiment and that the slats are tilted on their longitudinal axes approximately 30° to the horizontal. The slats are spaced apart by a distance sufficient to allow sun angles of approximately ±22° to pass between them. Small arrows in FIG. 7 show a flow of heated air up through the interior chamber of the collector assembly as illustrated in FIG. 6. As seen in FIG. 7, each slat 27 shadows a portion of the next lower slat 27 when the sun's rays are at a higher angle, such as in summer when a typical angle may be 65° above horizontal. At this angle, much of the solar energy will be reflected off the glass panel 30. Rays of light striking the surface of the slat 27 which is exposed will strike at a more nearly normal angle and will thus be entirely absorbed. However, the shading effect at higher sun angles serves to reduce the efficiency of the solar collector apparatus during the summer months. Also, since a smaller area of each slat 27 is directly illuminated, a small amount of energy is actually trapped. Air is allowed to flow upwards or is forced by a pump means (not shown) to traverse the slatted chamber created by glazing member 30 frame members 1, 2 or 3 and back panel 28. The air flow currents created by the curved undersides of the slats 27 achieve thorough mixing and effective heat transfer in a most efficient manner. The summer months, as noted above, are characterized by having sun angles high above the horizon, but during the winter months, the sun angles may fall below approximately 30°. During such times, rays of sunlight will illuminate virtually all of each slat 27 and a good deal more solar energy will be collected as a result thereof. This accounts for varying angles of the sun with slats fixed at an approximately 30° angle. However, when the solar collector assembly will be mounted on a building in other than the vertical orientation, the 30° slat angle will be modified plus or minus by the angle of tilt of the entire assembly so as to preserve the desired relationship between incoming rays of sunlight striking slats 27.

Figure 8:
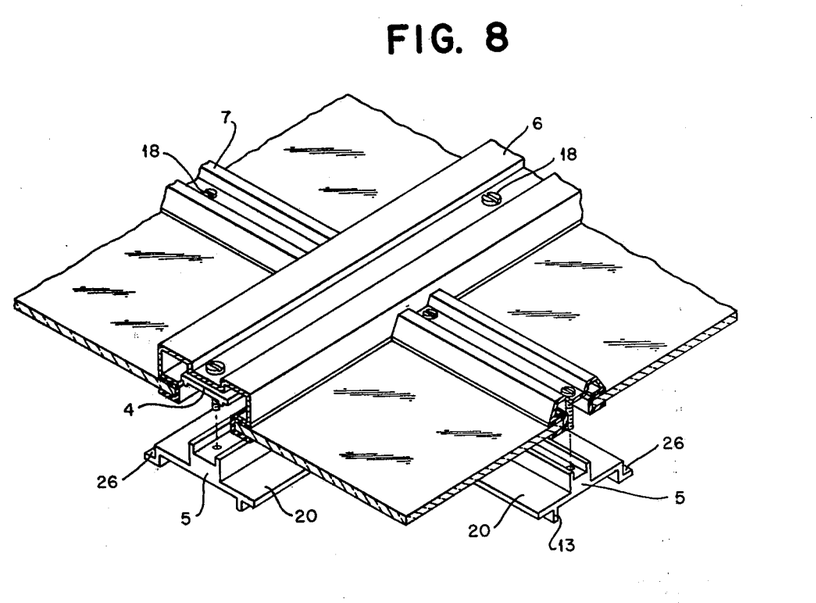
FIG. 8 illustrates the external appearance in assembly details for the glazing panels which are sealed to the structural framework and held rigidly in place in an attractive weather tight configuration.
Figure 9:
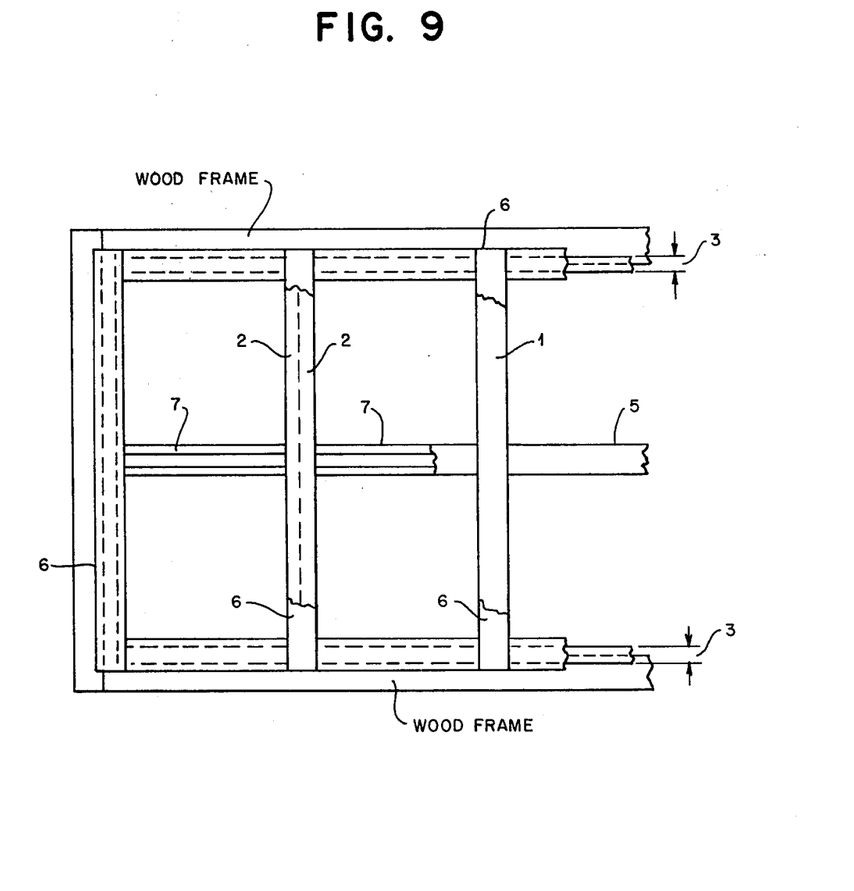
FIG. 9 illustrates how the glazing system is modularly assembleable to any desired size by proper selection and alternation of structural members.

Turning to FIG. 8, the exterior skin or assembled surface of the solar collector apparatus according to the present invention is shown in which the exterior finishing and clamp members 6, 7 are attached by suitable screw means 18 to the horizontal members 5 in the horizontal direction and to surface 9 of numbers 1, 2, and 3 (not shown) and to the assembly of numbers 4 and 5 as previously discussed. It is preferred that members 6 always be oriented in a vertical direction in the final assembly to channel water down off of the members and that the clamping member 7 be installed with its sloped sides in the horizontal direction in the final assembly to shed water as it runs down the glazing surface as clearly illustrated in FIG. 4.

The complete assembly of the solar collector apparatus will now be understood since the elements have been described. In practice, sections of member 1 shown in FIG. 2 will be cut along the line shown to generate elements 2, 3 and 4, respectively. These will be joined into longitudinal frame segments as previously described by means of precision gaging surfaces and fastening means in the assembly. Members 2 are called half sections and will be utilized in a completed matrix of a final solar collector framework in matching pairs as shown in FIG. 3. Such pairs of members 2 make easy expansion of the entire solar energy collection apparatus in the horizontal direction simple since any number of rectangular subframe elements may be formed together in this fashion as shown in FIG. 3 in precision arrangement but without the use of skilled labor or precision tools. Members 1, 2 or 3 are preferred to be interspaced for usage in the completed framework in a vertical orientation as previously described. The complete assembly matrix consists of a central member of type 1 cross section joined to other members by horizontal members 5 which connect cross sectional members 2 or 3. Joined pairs of section 2 will be utilized whenever the submodular panel assemblies are to be joined to one another as shown in FIG. 3. Elements 3 are utilized when the edges or peripheral extent of the solar collector apparatus is reached and are utilized to join the apparatus to wooden dimensional supporting framework as shown in FIG. 5. The vertical end terminations of members 1, 2 or 3, or segments of cross sectional member 3, will be mounted on wood framework through the intermediate support of another member 3 closing the top or bottom the vertical members.

ADVANTAGES

As will be appreciated from the foregoing description of the preferred embodiment, what has been achieved is a solar collector apparatus and glazing system which provides precision support surfaces for glazing panels and which can be easily assembled using simple tools in a precise fashion with minimum material waste and with a self-aligning, self-gaging, self-spacing modularly assemblable framework structure. It can also be appreciated that the resulting expandable solar energy collector with its curved and slanted reflection and capture baffles serves as an efficient and seasonal self-regulating collector of extreme simplicity which requires no maintenance or adjustments. Entire wall assemblies of solar collector apparatus may be fabricated and taken to the site for construction and attached to the side wall of a house. For example, any number of subframe elements may be sent to the site and erected on the spot with a minimum of labor. Each of the elements can be precut to exact dimensions in length in a stamping plant, packaged as units and shipped. This fact, combined with the self-gaging, self-spacing characteristics formed in the various members as described, facilitates an easy and exact installation by unskilled labor on the site. The ease of assembly and ease of expansion in the extended vertical and horizontal directions are accommodated by joining numbers of subframe assemblies as described. This is also highly desirable since a custom installation can be constructed of any desired size without choosing a special basic design or structure or modifying existing ones.

Having thus described my invention with relations to a preferred embodiment thereof, it will be easily appreciated by those of skill in the art that many variations in the exact form, and dimensions of the support members can be achieved which would serve the same purpose of precision gaging, spacing and assembly clamping as described. Therefore, it is intended in the claims which follow not to be limited to the specific shapes from them shown.

What is claimed is:

1. Framing apparatus for glazing solar energy collector panels, comprising:

a first elongated channel shaped glazing support member having, in a transverse cross section thereof, two partial top walls, two side walls and a bottom wall, said walls being connected to one another and having first and second pairs of parallel support surfaces formed on said side walls and top walls, respectively, said pairs of support surfaces being disposed on opposite sides of the longitudinal center of said member and in co-planar relationship with each other;

a second elongated glazing support member having two parallel support surfaces formed thereon, said member being equal in transverse cross section to that of one-half of said first member divided symmetrically at its longitudinal center line;

a third elongated glazing support member having two parallel support surfaces formed thereon, said member being equal to a transverse cross section of said first member divided longitudinally along the line to the inner edge of said support surface in said partial top wall;

a fourth member, said member being equal in longitudinal cross section to a segment of said bottom wall of said first member, said segment lying between said dividing lines defining said third member on said first member;

a fifth elongated glazing support member, said member having in a longitudinal cross section thereof, two co-planar support surfaces and two pairs of parallel gaging surfaces arranged perpendicular to said two co-planar support surfaces, said pairs of perpendicular gaging surfaces being disposed on opposite sides of said plane of said support surfaces;

a sixth elongated member, said member having, in transverse cross section thereof, a top wall, two side walls approximately perpendicular to said top wall, and two partial bottom walls attached to said walls and perpendicular thereto;

a seventh elongated member, said member having in transverse cross section thereof, a top wall, two sides walls generally inclined at an acute angle to said top wall, and two partial bottom walls attached to said side walls and parallel to said top wall;

said first through seventh members being connected together in a glazing framework in which longitudinally abutted pairs of said second members are gaged in abutment with one of said pairs of parallel gaging surfaces on a transverse segment of said fifth member and are fastened together by a transverse segment of said fourth member, said fourth and fifth member segments being connected to one another to form a combined gaging and clamping means for said abutted pairs of said second members;

said fourth member segment being an exterior gage and said pair of parallel gaging surfaces on said fifth member segment being an interior gage as spaced with said assembled pair of second members to form, in combined transverse cross section, a cross section equal to said first member;

and elongated segments of said fifth member being connected in regular array to transverse segments of said first, second or third members, said other pair of perpendicular gaging surfaces of said fifth member resting on said first parallel support surfaces of said members by engaging the height of said co-planar support surfaces of said fifth member such that said support surface of said fifth member is in a co-planar relationship with said second co-planar support surface of said first, second, or third members, respectively; and segments of said sixth member being arranged parallel to said segments of said first member or to abutted segments of said second member or to segments of said third member in said regular array with said partial bottom walls of said sixth member overlying said second support surfaces from said first, second or third members; and segments of said seventh member being arranged parallel to said segments of said fifth member in a completed frame array with said partial bottom walls of said seventh member overlying said co-planar support surfaces of said fifth member segments.

2. Apparatus as described in claim 1, and further comprising:

an insulated rigid panel member connected to said bottom wall of said first, second or third member segments in said array and co-extensive with the expanse of said entire array to enclose and insulate the side of said collector which is parallel to and opposite said glazing support surfaces.

3. Solar energy collector panel apparatus comprising:

a first elongated channel shaped glazing support member having, in a transverse cross section thereof, two partial top walls, two side walls and a bottom wall, said walls being connected to one another and having first and second pairs of parallel support surfaces formed on said side walls and top walls, respectively, said pairs of support surfaces being disposed on opposite sides of the longitudinal center of said member and in co-planar relationship with each other;

a second elongated glazing support member having two parallel support surfaces formed thereon, said member being equal in transverse cross section to that of one-half of said first member divided symmetrically at its longitudinal center line;

a third elongated glazing support member having two parallel support surfaces formed thereon, said member being equal to said transverse cross section of said first member divided longitudinally along the line to the inner edge of said support surface in said partial top wall;

a third member, said member being equal in longitudinal cross section to a segment of said bottom wall of said first member, said segment lying between said dividing lines defining said third member on said first member;

a fifth elongated glazing support member, said member having longitudinal cross section thereof, two co-planar support surfaces and two pairs of parallel gaging surfaces arranged perpendicular to said two coplanar support surfaces, said pair of perpendicular gaging surfaces being disposed on opposite sides of said plane of said support surfaces;

a sixth elongated member said member having in transverse cross section thereof a top wall, two side walls approximately perpendicular to said top wall and two partial bottom walls attached to said walls and perpendicular thereto;

a seventh elongated member, said member having in transverse cross section thereof, a top wall, two side walls generally inclined at an acute angle to said top wall, and two partial bottom walls attached to said side walls and parallel to said top wall;

said first through seventh members being connected together in a glazing framework in which longitudinally abutted pairs of said second members are gaged in abutment with one of said pairs of parallel gaging surfaces on a transverse segment of said fifth member and are fastened together by a transverse segment of said fourth member, said fourth and fifth member segments being connected to one another to form a combined gaging and clamping means for said abutted pairs of said second members;

said fourth member of said segment being an exterior gage and said pair of parallel gaging surfaces on said fifth member segment being an interior gage as spaced with said assembled pair of upper members to form, in combined transverse cross section, a cross section equal to said first member;

and elongated segments of said fifth member being connected in regular array to transverse segments of said first, second or third members, said other pair of perpendicular gaging surfaces of said fifth member resting on said first parallel support surfaces of said members by engaging the height of said co-planar support surfaces of said fifth member such that said support surface of said fifth member is in a co-planar relationship with said second co-planar support surface of said first, second or third members, respectively;

segments of said sixth member being arranged parallel to said segments of said first member, or to pairs of abutted segments of said second member or to segments of said third member in said regular array with said partial bottom walls of said sixth member overlying said second support surfaces from said first, second or third members;

segments of said seventh member being arranged parallel to said segments of said fifth member in a completed regular array with said partial bottom walls of said seventh member overlying the co-planar support surfaces of said fifth member segments;

an insulated rigid panel member connected to said bottom wall of said first, second or third member segments in said array and co-extensive with the expanse of said entire array to enclose and insulate the side of said framework opposite said glazing surface which is parallel to said support surfaces;

optically transmissive glazing panels of material resting on said co-planar support surfaces formed by said support surfaces on said first, second or third member segments in said array and by said co-planar support surfaces of said fifth member segment in said array, said optically transmissive panels being clamped to said support surfaces by said segments of said sixth and seventh members.

4. The apparatus as claimed in claim 3, and further comprising:
a plurality of arcuately curved cross section light absorbing baffles, said baffles being perpendicularly mounted between adjacent side walls of said first, second or third member segments in said regular array and between and parallel to said glazing panels and said insulated rigid panels.

5. The apparatus as described in claim 4, wherein:
said baffles are angled with respect to said glazing panels and an acute angle, said angle between determined above the horizontal and with its apex at said glazing panels when said glazing panels are in said framework and arranged generally in a vertical relationship to the earth.

6. The apparatus as described in claim 5, wherein:
said acute angle is approximately 30° and is modified by an amount plus or minus a number of degrees of tilt from vertical which is assumed by said panels and said framework when said apparatus is in use.

* * * * *

UNITED STATES PATENT OFFICE
CERTIFICATE OF CORRECTION

Patent No. 4,114,595                           Dated September 19, 1978

Inventor(s) Harold Reed Barker

It is certified that error appears in the above-identified patent and that said Letters Patent are hereby corrected as shown below:

On the cover sheet Inventor address should read:

-- (76) Harold R. Barker, 805 29th Street #252
   Boulder, Colo., 80303 ---.

Signed and Sealed this

*Twentieth* Day of *March 1979*

[SEAL]

Attest:

RUTH C. MASON
*Attesting Officer*

DONALD W. BANNER
*Commissioner of Patents and Trademarks*